United States Patent [19]

Suzuki et al.

[11] 4,122,497
[45] Oct. 24, 1978

[54] FACSIMILE RECEIVER CAPABLE OF BACKWARDLY FEEDING A CONTINUOUS RECORDING MEDIUM AFTER A SEPARATE SHEET IS CUT THEREFROM

[75] Inventors: Etsuo Suzuki; Hidekazu Sakurai, both of Tokyo, Japan

[73] Assignee: Nippon Electric Co., Ltd., Tokyo, Japan

[21] Appl. No.: 787,116

[22] Filed: Apr. 13, 1977

[51] Int. Cl.² ............................................. H04N 1/22
[52] U.S. Cl. ...................................... 358/304; 346/24
[58] Field of Search ........................... 358/304; 346/24

[56] References Cited

U.S. PATENT DOCUMENTS

| 3,614,306 | 10/1971 | Goldberg | 358/304 |
| 3,973,264 | 8/1976 | Costello | 358/304 |

*Primary Examiner*—Bernard Konick
*Assistant Examiner*—Alan Faber
*Attorney, Agent, or Firm*—Sughrue, Rothwell, Mion, Zinn and Macpeak

[57] ABSTRACT

In a facsimile receiver, a reversible pulse motor feeds a continuous recording medium forwardly during recording, further forwardly to a cutter after the recording, and backwardly after cutting from the continuous recording medium by the cutter of a separate sheet on which a figure, namely, a picture or its equivalent, is recorded. During the recording, clock pulses may be counted by a counter and supplied in groups to the pulse motor to stepwise feed the recording medium. The amount of the further feed should not be less than that of the backward feed. Preferably, these amounts are determined by two counters energized when the recording ends and when the cutter works, respectively, to count the clock pulses to predetermined counts. Alternatively, a single counter is similarly energized to count the clock pulses to a predetermined count so as to render the amounts equal. The clock pulses to be counted for the further and the backward feed may have a higher repetition frequency than the pulses for the stepwise feed. The cutter may work as soon as the counter counts the clock pulses to the predetermined count for the further feed.

11 Claims, 5 Drawing Figures

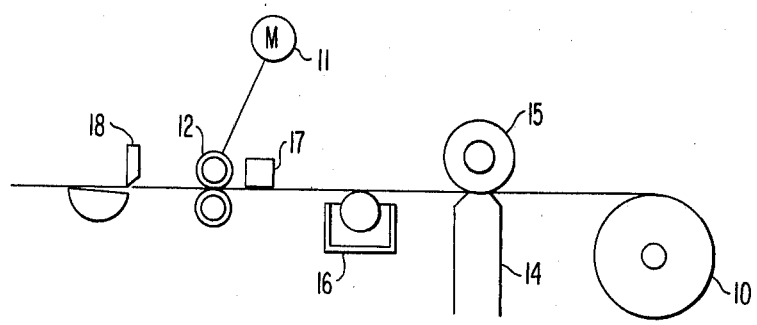
FIG 1
PRIOR ART
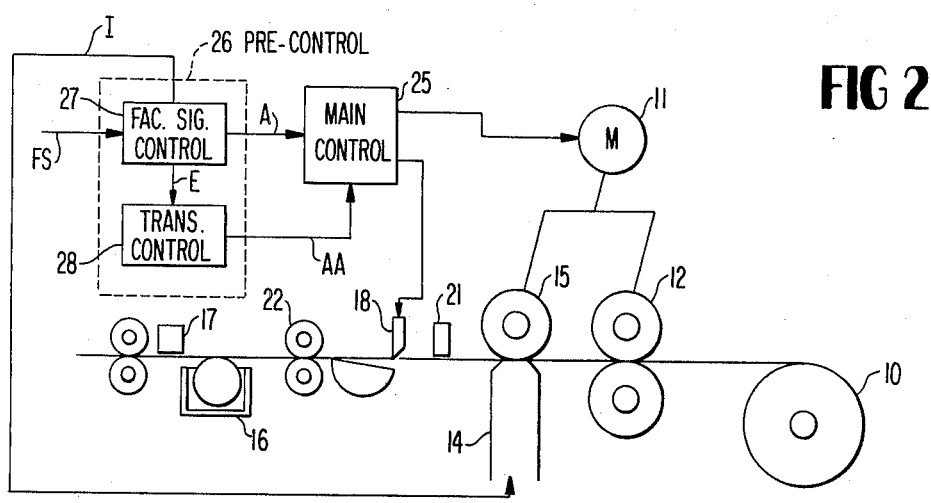
FIG 2
FIG 4
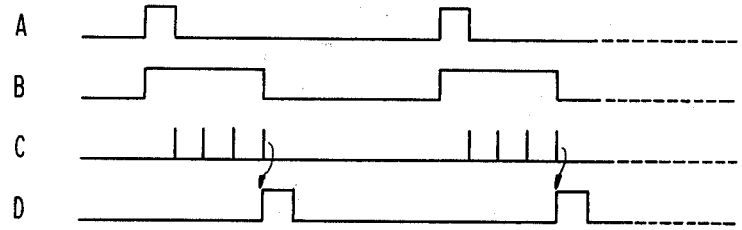

FACSIMILE RECEIVER CAPABLE OF BACKWARDLY FEEDING A CONTINUOUS RECORDING MEDIUM AFTER A SEPARATE SHEET IS CUT THEREFROM

BACKGROUND OF THE INVENTION

This invention relates to a facsimile receiver for a continuous recording medium and, more particularly, to a facsimile receiver comprising an improved device for controllably feeding a continuous recording medium.

A facsimile receiver is generally supplied with facsimile signals from one or more cooperating facsimile transmitters. The facsimile signals, as called herein, comprise a sequence of image signals representative of a figure, namely, a picture or its equivalent, and a reproduction end signal following the image signal sequence. In a facsimile receiver for a continuous recording medium, a motor controllably feeds the recording medium while a recording head records thereon a figure in response to an image signal sequence. As will later be described with reference to a figure of the accompanying drawing, the motor further feeds the recording medium to a cutter placed considerably forwardly of the recording head and then stops feeding the recording medium, when the cutter cuts from the continuous recording medium a separate sheet on which the figure is recorded. When supplied with another image signal sequence, the receiver repeats the above-described operation. A considerable blank space has therefore been indispensable on each separate sheet. This means an objectionable loss of the recording medium. Furthermore, each separate sheet is unfavorably wider than the area of the figure.

SUMMARY OF THE INVENTION

It is therefore an object of the present invention to provide a facsimile receiver for a continuous recording medium, whereby a reduction to a minimum is possible in an unnecessary loss of the recording medium.

It is another object of this invention to provide a facsimile receiver of the type described, which is capable of successively producing those separate sheets of the recording medium on which figures are recorded, respectively, and which are of areas suitable to the respective figures.

Furthermore, a facsimile receiver according to this invention is readily adapted to operation responsive to redundancy reduced facsimile signals.

A facsimile receiver to which this invention is applicable comprises feeding means for feeding when put into operation a continuous recording medium along a preselected path of feed, recording means responsive to facsimile signals representative of figures for successively recording the figures on the continuous recording medium fed by the feeding means, signal producing means responsive to the facsimile signals for producing a cutter drive signal in timed relation to recording by the recording means of each of the figures, a cutter responsive to the cutter drive signal for cutting from the continuous recording medium a separate sheet on which the above-mentioned each figure is recorded, and coupling means between the recording means, signal producing means, and feeding means for controllably putting the feeding means into operation. In accordance with this invention, the coupling means comprises first means connected to the recording means for producing a first control signal during recording by the recording means of the above-mentioned each figure, second means connected to the recording means and signal producing means for producing a second control signal of a first predetermined duration after recording by the recording means of the above-mentioned each figure and before production by the signal producing means of the cutter drive signal, third means connected to the second means and signal producing means for producing a third control signal of a second predetermined duration after production by the signal producing means of the cutter drive signal, and drive means connected to the first through third means and feeding means for putting the feeding means into a first, a second, and a third phase of operation of feeding in response to the first control signal the continuous recording medium in a predetermined one of senses of the path, of further feeding in response to the second control signal the continuous recording medium in the above-mentioned one sense, and of feeding in response to the third control signal in the other of the senses the continuous recording medium from which the separate sheet is cut, respectively. The second predetermined duration should not be longer than the first predetermined duration. The feeding means is capable of feeding the continuous recording medium in whichever of the senses.

BRIEF DESCRIPTION OF THE DRAWING

FIG. 1 is a schematic side view of a conventional electrostatic facsimile receiver for a continuous recording medium;

FIG. 2 shows a schematic side view of a facsimile receiver according to a preferred embodiment of this invention, together with a block diagram of a control circuit thereof;

FIG. 4, consisting of A-D is a time chart of signals appearing in the control circuit shown in FIG. 3.

DESCRIPTION OF THE PREFERRED EMBODIMENTS

Figure 3:
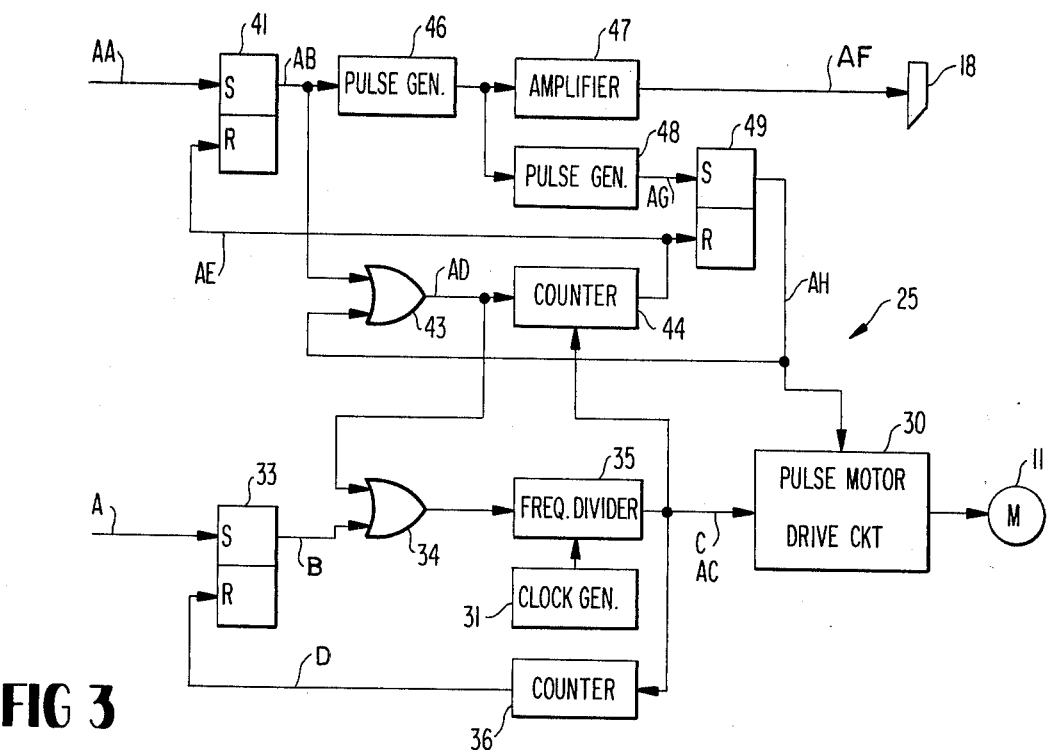
FIG. 3 is a circuit diagram of a portion of the control circuit illustrated in FIG. 2.

Referring to FIG. 1, a conventional electrostatic facsimile receiver will be described at first for a better understanding of the present invention. The facsimile receiver is for a continuous recording medium supplied from a roll 10 thereof. Supplied with facsimile signals from one or more cooperating facsimile transmitters (not shown), the facsimile receiver reproduces original figures, namely, pictures or their equivalents, successively on the recording medium. When a reproduction start signal is derived from the facsimile signals, an electric motor 11 starts to drive a main feed roller 12 for feeding in cooperation with an unnumbered roller the recording medium along a preselected path of feed at a predetermined speed until a reproduction end signal is derived from the facsimile signals. In response to a sequence of image signals derived from the facsimile signals, a recording head 14 disposed between the roll 10 and the feed roller 12 scans transversely of the path of feed and thereby forms a latent image of the figure along a plurality of lines of scan spaced along the path of feed on the recording medium fed at the predetermined speed. A pinch roller 15 cooperates with the recording head 14. The speed of feed is determined by a density of the scanning lines. Forwardly along the path of the recording head 14, a developing unit 16 is positioned to develop the latent image into a visible image of the figure, which is thereafter fixed by a fixing unit 17 to form a reproduction of the original figure on the continuous recording medium. The feed roller 12 further feeds the continuous recording medium to a cutter 18 for cutting in response to a cutter drive signal derived from the reproduction end signal that separate sheet from the continuous recording medium on which the reproduction is formed. Inasmuch as the continuous recording medium travels a considerable distance from the recording head 14 to the cutter 18, the conventional facsimile receiver has the defects pointed out in the preamble of the instant specification.

Turning to FIG. 2, an electrostatic facsimile receiver according to a preferred embodiment of this invention comprises similar parts designated by like reference numerals as in FIG. 1. It should, however, be understood that the motor 11 is a reversible pulse motor controlled in a manner described later and that the cutter 18 is placed appreciably adjacent to the recording head 14 with the developing and fixing units 16–17 positioned further forwardly of the cutter 18. In the example being illustrated, the pinch roller 15 is also driven by the motor 11. Between the recording head 14 and the cutter 18, a detecting unit 21 is disposed for optically or otherwise detecting the recording medium passing thereby to produce a feed timing signal for putting auxiliary feed roller 22 into operation of feeding to the developing and fixing units 16–17 a separate sheet cut from the continuous recording medium.

Further referring to FIG. 2, the illustrated facsimile receiver is for facsimile signals FS of a band or redundancy reduction coding system, such as a runlength coding system, and comprises a main control circuit 25 and a pre-control circuit 26. The pre-control circuit 26 comprises a facsimile signal controller 27 and a transmission controller 28. The facsimile signal controller 27 may be a band expander circuit known in the art. Although not depicted in detail, the band expander circuit for the runlength coding system comprises a buffer memory for temporarily storing the facsimile signals FS, a decoder for successively deriving from the facsimile signals FS for each figure a reproduction start signal, a sequence of image signals, and a reproduction end signal E, and a line memory for temporarily storing the image signals for every line of scan to successively produce image signal units I, each corresponding to a predetermined number of lines of scan, and line step start signals A for the respective lines of scan. Responsive to the reproduction end signal E, the transmission controller 28 produces a page end signal AA. The line step start signals A and the page end signal AA are supplied to the main control circuit 25 to controllably drive the motor 11 in the manner described hereunder while the image signal units I are supplied to the recording head 14.

Referring to FIG. 2 again and to FIGS. 3 and 4 afresh, the main control circuit 25 comprises a drive unit comprising, in turn, a known pulse motor drive circuit 30 for the reversible pulse motor 11 and a first unit supplied with the line step start signals A from the pre-control circuit 27 for supplying a first control signal B to the drive unit during recording by the recording head 14 of each figure. In the example being illustrated, the drive unit comprises a clock generator 31 for generating clock pulses. The first unit comprises a first flip-flop circuit 33 set by each pulse of the line step start signals A to supply its set output as a step pulse of the first control signal B through a first OR gate 34 to a gating circuit 35 for gating the clock pulses as a first driving signal to the motor 11 through the motor drive circuit 30. The first unit further comprises a single counter 36 for counting the clock pulses gated by the gating circuit 35 to a predetermined count, such as one, two, three, or four, to produce a pulse of a stop signal D upon counting the gated clock pulses to the predetermined count. The stop signal resets the flip-flop circuit 33. During an interval between a pulse of the stop signal D and a next succeeding pulse of the line step start signals A, rotation of the motor 11 is suspended. In the meantime, the recording head 14 records the latent image partially along the predetermined number of scanning lines in response to the pertinent one of the image signal units I. The main feed roller 12 thus feeds the continuous recording medium towards the cutter 18 stepwise and consequently relatively slowly.

Figure 5:
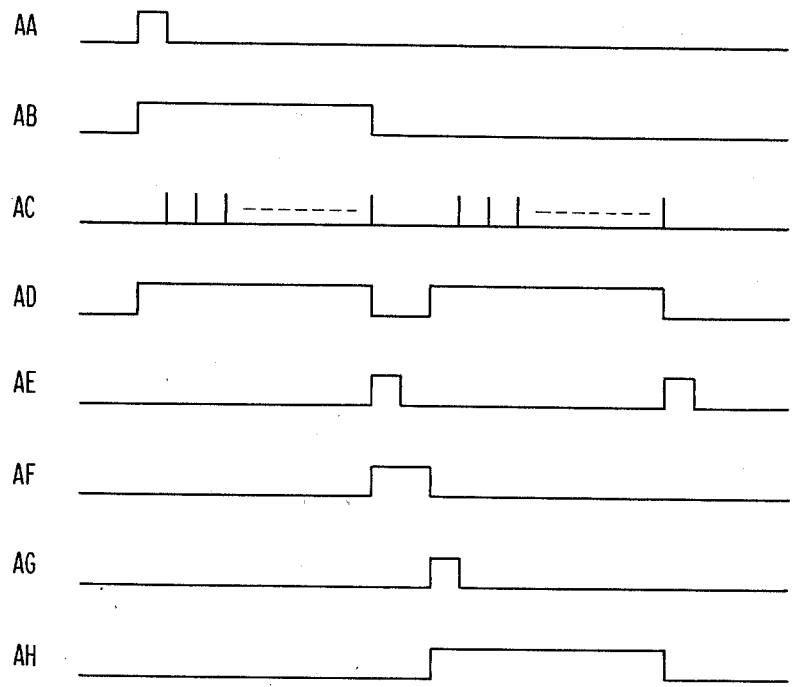
FIG. 5 is a time chart of other signals appearing in the control circuit depicted in FIG. 3.

Referring to FIGS. 2 and 3 again and to FIG. 5 afresh, the main control circuit 25 further comprises a second unit responsive to the page end signal AA supplied from the pre-control circuit 26 for producing a second control signal AB of a first predetermined duration after recording by the recording head 14 of the figure. More particularly, the second unit comprises a second flip-flop circuit 41 set by the page end signal AA to supply its set output as the second control signal AB to the gating circuit 35 through a second OR gate 43 and the first OR gate 34 to make the gating circuit 35 supply, in turn, gated clock pulses as a second driving signal AC (left portion in FIG. 5) to the motor 11 through the motor drive circuit 30. The signal having passed through the second OR gate 43 is illustrated in FIG. 5 at AD, a first pulse depicted in the left half being now used. The second control signal AB is supplied also to a counter device 44 through the second OR gate 43 to make the counter device 44 count the gated clock pulses AC to a first prescribed count, such as 280, corresponding to the first predetermined duration and produce a first command signal AE (a first pulse in FIG. 5) when the count reaches the first prescribed count. The command signal AE resets the second flip-flop circuit 41. It is to be pointed out here that no line step start signals A (FIG. 4) are supplied to the first flip-flop circuit 33 until facsimile signals are supplied to the receiver for another subsequent figure and that the first flip-flop circuit 33 is kept in the reset state even when the single counter 36 counts the gated clock pulses AC to the count predetermined therefor. Inasmush as the first prescribed count for the counter device 44 is considerably large, the main feed roller 12 feeds the continuous recording medium to the cutter 18 continuously and consequently relatively rapidly. A trailing edge of the second control signal AB energizes a cutter drive signal producing unit comprising a first pulse generator 46, such as a monostable multivibrator, for supplying a cutter drive signal AF to the cutter 18 through an amplifier 47. It is now understood that the second unit is connected also to the signal producing unit to produce the second control signal AB before production by the signal producing unit of the cutter drive signal AF. Incidentally, a second pulse generator 48, such as a monostable multivibrator, produces a reverse feed command pulse AG in response to a trailing edge of the signal produced by the first pulse generator 46 for the cutter drive signal AF.

Further referring to FIGS. 2, 3, and 5, the main control circuit 25 comprises a third unit connected to the second unit and the signal producing unit for producing a third control signal AH of a second predetermined duration after production by the signal producing unit of the cutter drive signal AF. The second predetermined duration should not be longer than the first predetermined duration for the reason which will presently be rendered clear. For the time being, the second predetermined duration is selected to be equal to the first predetermined duration. In the illustrated example, the third unit comprises a third flip-flop circuit 49 set by the reverse feed command pulse AG to supply its set output as the third control signal AH to the motor drive circuit 30. The reverse feed command pulse AG is supplied also to the counter device 44 through the second OR gate 43 (a second pulse depicted in FIG. 5 at AD) and to the gating circuit 35 through the second and first OR gates 43 and 34 to again energize the counter device 44 and the gating circuit 35. The gated clock pulses AC (right portion in FIG. 5) are supplied through the motor drive circuit 30 controlled by the third control signal AH to the motor 11 as a third driving signal AC (the right portion). The gated clock pulses AC are counted again by the counter device 44 to the prescribed count, when the counter device 44 supplies a second command signal AE (a second pulse in FIG. 5) to the third flip-flop circuit 49 to reset the same. The main feed roller 12 reversedly or backwardly and relatively rapidly feeds the continuous recording medium from which the separate sheet is cut in response to the cutter drive signal AF next preceding the instant third command signal AH. In the meanwhile, the auxiliary feed roller 22 feeds the separate sheet through the developing and fixing units 16–17. It is to be mentioned here that the forward or leading edge of the continuous recording medium should be manually or otherwise placed slightly forwardly of the recording head 14 before reception by the receiver of facsimile signals. The backward feed returns a new leading edge of the continuous recording medium to the slightly forward position when the second predetermined duration is rendered equal to the first predetermined duration.

In order to insure presence of a recording medium always at the position of the recording head 14 despite possible play in the recording medium feeding mechanism and to thereby protect the recording head 14 against possible damage, the second predetermined duration may be rendered shorter than the first one. This is made possible by using as the counter device 44 a first and a second counter for counting the gated clock AC for the second and third driving signals to the first prescribed count mentioned above and to a second prescribed count corresponding to the shorter second predetermined duration, respectively.

When a much faster speed of feeding is desired before and after operation of the cutter 18 than the speed of feeding during the recording operation, use is possible as the clock generator 31 of a first and a second clock generator for generating first and second clock pulses of a lower and a higher repetition frequency. The gating circuit 35 should gate the first clock pulses in response to the first control signal B and the second clock pulses in response to the second and third control signals AB and AH. It is possible to select the predetermined count for the single counter 36 in consideration of the line density and to make the recording head 14 and the cutter 18 carry out recording and cutting while the recording medium is fed.

What is claimed is:

1. In a facsimile receiver comprising controllable feeding means for feeding when put into operation a continuous recording medium along a path of preselected direction in a predetermined one of the two senses of said direction, recording means responsive to facsimile signals representative of figures for successively recording said figures on the continuous recording medium fed by said feeding means, signal producing means responsive to said facsimile signals for producing a cutter drive signal in timed relation to recording by said recording means of each of said figures, a cutter responsive to said cutter drive signal for cutting from said continuous recording medium a separate sheet on which said each figure is recorded, and coupling means between said recording means, signal producing means, and feeding means for controllably putting said feeding means into operation, the improvement wherein said coupling means comprises first means connected to said recording means for producing a first control signal during recording by said recording means of said each figure, second means connected to said recording means and signal producing means for producing a second control signal of a first predetermined duration after recording by said recording means of said each figure and before production by said signal producing means of said cutter drive signal, third means connected to said second means and signal producing means for producing a third control signal of a second predetermined duration after production by said signal producing means of said cutter drive signal, and drive means connected to said first through third means and feeding means for putting said feeding means into a first, a second, and a third phase of operation, said first phase being that of feeding in response to said first control signal said continuous recording medium in said predetermined sense, said second phase being that of further feeding in response to said second control signal said continuous recording medium in said predetermined sense, and said third phase being that of feeding in response to said third control signal in the other of said senses the continuous recording medium from which said separate sheet is cut, respectively, said second predetermined duration being not longer than said first predetermined duration, said feeding means being capable of feeding the continuous recording medium in whichever of said two senses.

2. A facsimile receiver as claimed in claim 1, wherein said drive means comprises clock generator means for generating clock pulses and fourth means connected to said clock generator means, first through third means, and feeding means for modifying said clock pulses into a first, a second, and a third driving signal in response to said first through third control signals, respectively, said first through third driving signals putting said feeding means into said first through third phases of operation, respectively.

3. A facsimile receiver as claimed in claim 2, said facsimile signals comprising a sequence of image signals for said each figure and a reproduction end signal following said image signal sequence, said recording means comprising signal separating means responsive to said facsimile signals for separately producing said image signal sequence and said reproduction end signal and a recording head responsive to said image signal sequence for recording said each figure on the continuous recording medium fed by said feeding means, wherein said second means comprises counter means connected to said fourth means for counting when energized the modified clock pulses to a first predetermined count corresponding to said first predetermined duration to produce a first command signal upon counting said modified clock pulses to said first predetermined count and fifth means connected to said signal separating means, counter means, and fourth means for starting production of said second control signal in response to said reproduction end signal and stopping production of said second control signal in response to said first command signal, said counter means being energized by said second control signal, said signal producing means being connected to said fifth means to produce said cutter drive signal after stop by said fifth means of production of said second control signal.

4. A facsimile receiver as claimed in claim 3, wherein said fifth means comprises a flip-flop circuit connected to said signal separating means, counter means, and fourth means, set by said reproduction end signal to produce a set output signal as said second control signal, and reset by said command signal, said signal producing means comprising pulse generator means connected to said flip-flop circuit for producing said cutter drive signal when said flip-flop circuit is reset by said command signal.

5. A facsimile receiver as claimed in claim 3, wherein said third means comprises a flip-flop circuit connected to said counter means, signal producing means, and fourth means and set by said cutter drive signal to produce a set output signal as said third control signal, said counter means being energized also by said third control signal for counting said modified clock pulses to a second predetermined count corresponding to said second predetermined duration to produce a second command signal upon counting said modified clock pulses to said second predetermined count, said flip-flop circuit being reset by said second command signal.

6. A facsimile receiver as claimed in claim 5, wherein said counter means consists of a single counter connected to said fourth means, fifth means, and flip-flop circuit and energized by said second and third control signals to count said modified clock pulses to said first predetermined count to produce said first and second command signals, respectively, said second predetermined count being identical with said first predetermined count.

7. A facsimile receiver as claimed in claim 5, wherein said counter means comprises a first counter connected to said fourth means and fifth means and energized by said second control signal to count said modified clock pulses to said first predetermined count and to produce said first command signal and a second counter connected to said fourth means and flip-flop circuit and energized by said third control signal to count said modified clock pulses to said second predetermined count and to produce said second command signal.

8. A facsimile receiver as claimed in claim 3, said recording head recording said each figure along a plurality of lines of scan spaced along said path as regards the continuous recording medium fed by said feeding means, said image signal sequence comprising a plurality of signal units, each of said signal units corresponding to a predetermined number of lines of scan, said signal separating means further separately producing said signal units, wherein said first means comprises sixth means connected to said signal separating means and fourth means for starting production of a step signal in response to said each signal unit and a single counter connected to said fourth means and sixth means and energized by said step signal to count said modified clock pulses to a third predetermined count corresponding to said predetermined number of lines of scan and to produce a stop signal upon counting said modified clock pulses to said third predetermined count, said sixth means stopping production of said step signal in response to said stop signal, the step signals serving as said first control signal.

9. A facsimile receiver as claimed in claim 8, wherein said fourth means comprises a driving circuit connected to said feeding means and gating means connected to said clock generator means, sixth means, fifth means, third means, and driving circuit for gating only when said signals and said second and third control signals are present the clock pulses generated by said clock generator means, said driving circuit being further connected to said gating means and third means to supply only when said step signals and said second control signal are present the clock pulses gated by said gating means to said feeding means as said first and second driving signals, respectively, and to supply only when said third control signal is present the clock pulses gated by said gating means in response to said third control signal to said feeding means as said third driving signal, said counter means and single counter being connected to said gating means to count the clock pulses gated by said gating means.

10. A facsimile receiver as claimed in claim 9, wherein said clock generator means consists of a single clock generator connected to said gating means and generating said clock pulses, said counter means and single counter counting when energized the clock pulses generated by said single clock generator and gated by said gating means.

11. A facsimile receiver as claimed in claim 9, wherein said clock generator means comprises a first clock generator for generating first clock pulses of a first repetition frequency and a second clock generator for generating second clock pulses of a second repetition frequency higher than said first repetition frequency, said gating means being connected to said first and second clock generators to gate said first clock pulses only when said step signals are present and said second clock pulses only when said second and third control signals are present, said single counter being connected to said gating means to count the first clock pulses generated by said first clock generator and gated by said gating means, said counter means being connected to said gating means to count the second clock pulses generated by said second clock generator and gated by said gating means.

* * * * *

UNITED STATES PATENT AND TRADEMARK OFFICE
CERTIFICATE OF CORRECTION

PATENT NO. : 4,122,497

DATED : October 24, 1978

INVENTOR(S) : Etsuo SUZUKI et al

It is certified that error appears in the above-identified patent and that said Letters Patent are hereby corrected as shown below:

IN THE SPECIFICATION:

Column 2, line 39 - delete "consisting of A-D"

IN THE CLAIMS:

Column 8, line 24 - after "said" (first occurrence) insert -- step --

Signed and Sealed this

Twentieth Day of February 1979

[SEAL]

Attest:

RUTH C. MASON
Attesting Officer

DONALD W. BANNER
Commissioner of Patents and Trademarks